US010554061B2

United States Patent
Liu et al.

(10) Patent No.: US 10,554,061 B2
(45) Date of Patent: Feb. 4, 2020

(54) BATTERY CHARGING SYSTEM

(71) Applicant: Integrated Device Technology, Inc., San Jose, CA (US)

(72) Inventors: Rui Liu, Fremont, CA (US); Gustavo James Mehas, Mercer Island, WA (US); Lijie Zhao, San Jose, CA (US); Tae Kwang Park, San Jose, CA (US); Zhitong Guo, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 134 days.

(21) Appl. No.: 15/828,158

(22) Filed: Nov. 30, 2017

(65) Prior Publication Data
US 2018/0159346 A1 Jun. 7, 2018

Related U.S. Application Data

(60) Provisional application No. 62/429,058, filed on Dec. 1, 2016.

(51) Int. Cl.
*H02J 7/00* (2006.01)

(52) U.S. Cl.
CPC ..... *H02J 7/0052* (2013.01); *H02J 2007/0062* (2013.01)

(58) Field of Classification Search
USPC ........................................................ 320/107
See application file for complete search history.

(56) References Cited

U.S. PATENT DOCUMENTS

| 9,431,845 | B2 | 8/2016 | Xu et al. |
| 2009/0033293 | A1* | 2/2009 | Xing .................... H02J 7/0077 320/164 |
| 2015/0188362 | A1 | 7/2015 | Mondal |
| 2016/0261190 | A1 | 9/2016 | Shenoy |
| 2016/0329809 | A1 | 11/2016 | Granato et al. |

OTHER PUBLICATIONS

International Search Report for PCT/US2017064225 issued by the ISA/US (dated Feb. 20, 2018) pp. 1-2.
Written Opinion of the ISA for PCT/US2017064225 issued by the ISA/US (dated Feb. 20, 2018) pp. 1-6.

* cited by examiner

*Primary Examiner* — Robert Grant
(74) *Attorney, Agent, or Firm* — Hayne and Boone, LLP

(57) ABSTRACT

A charging system that includes a switching control circuit coupled to four series-coupled MOSFET transistors; a flying capacitor coupled across two of the four series-coupled MOSFET transistors; and node between the two of the four series coupled transistors that couples to an output inductor to form a buck regulator is presented. Embodiments of the charging system can have increased efficiency, can reduce the size and inductance of the output inductor, and can be produced with a low voltage process.

14 Claims, 2 Drawing Sheets

BATTERY CHARGING SYSTEM

RELATED APPLICATIONS

The present application claims priority to U.S. Provisional Application 62/429,058, filed on Dec. 1, 2016, and U.S. Provisional Application 62/429,056, filed on Dec. 1, 2016, and U.S. Provisional Application 62/428,737, filed on Dec. 1, 2016, which are all herein incorporated by reference in their entirety.

TECHNICAL FIELD

Embodiments of the present invention are related to charging systems and, in particular, to battery charging systems.

DISCUSSION OF RELATED ART

There is increasing demand for use of mobile devices that include battery charges. It is desirable that the battery charges for devices, especially for mobile devices, be fast and efficient. Most battery charges includes two series coupled transistors configured to form a Buck regulator are driven by a control circuit to function as a switching charger. However, in order to keep the size of the inductor in the Buck regulator low and the DC resistance (DCR) of the inductor low, the series coupled transistors are often switched at high frequency (2 to 4 MHz).

To meet fast charging requirements (e.g., 3 A battery charging currents or higher), the bus voltage is often increased to 9V, 12V or higher to meet the VBUS pin current requirement of universal serial bus (USB) micro connectors. However, higher VBUS voltage generates much more switching loss at high switching frequency, the switching loss being proportional to the voltage across the two series coupled transistors. Using higher VBUS voltages can also increase the ripple current of the output inductor and higher voltage processing requires larger components, increasing the die size and resulting in higher costs. Further, increased transistor sizes can reduce conduction loss, but increases switching loss.

Therefore, there is a need to develop better, higher efficiency battery charging systems.

SUMMARY

In accordance with aspects of the present invention, a charging system includes a first transistor coupled to receive a bus voltage; a second transistor coupled in series with the first transistor; a third transistor coupled in series with the first transistor and the second transistor; a fourth transistor coupled between ground and the third transistor; switching control circuit coupled to control the gates of the first transistor, the second transistor, the third transistor, and the fourth transistor; and a flying capacitor coupled across the second transistor and the fourth transistor, wherein a node between the second transistor and the fourth transistor is configured to couple to an output inductor to provide a system voltage as the switching control circuit switches the first transistor, the second transistor, the third transistor, and the fourth transistor.

A method of charging according to some embodiments includes receiving a bus voltage across four series-coupled transistors; driving gates of two of the four series-coupled transistors to charge a flying capacitor coupled across two of the four series-coupled transistors; and driving gates of two of the four series-coupled transistors that have a node that can couple to an output inductor to supply a system voltage.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
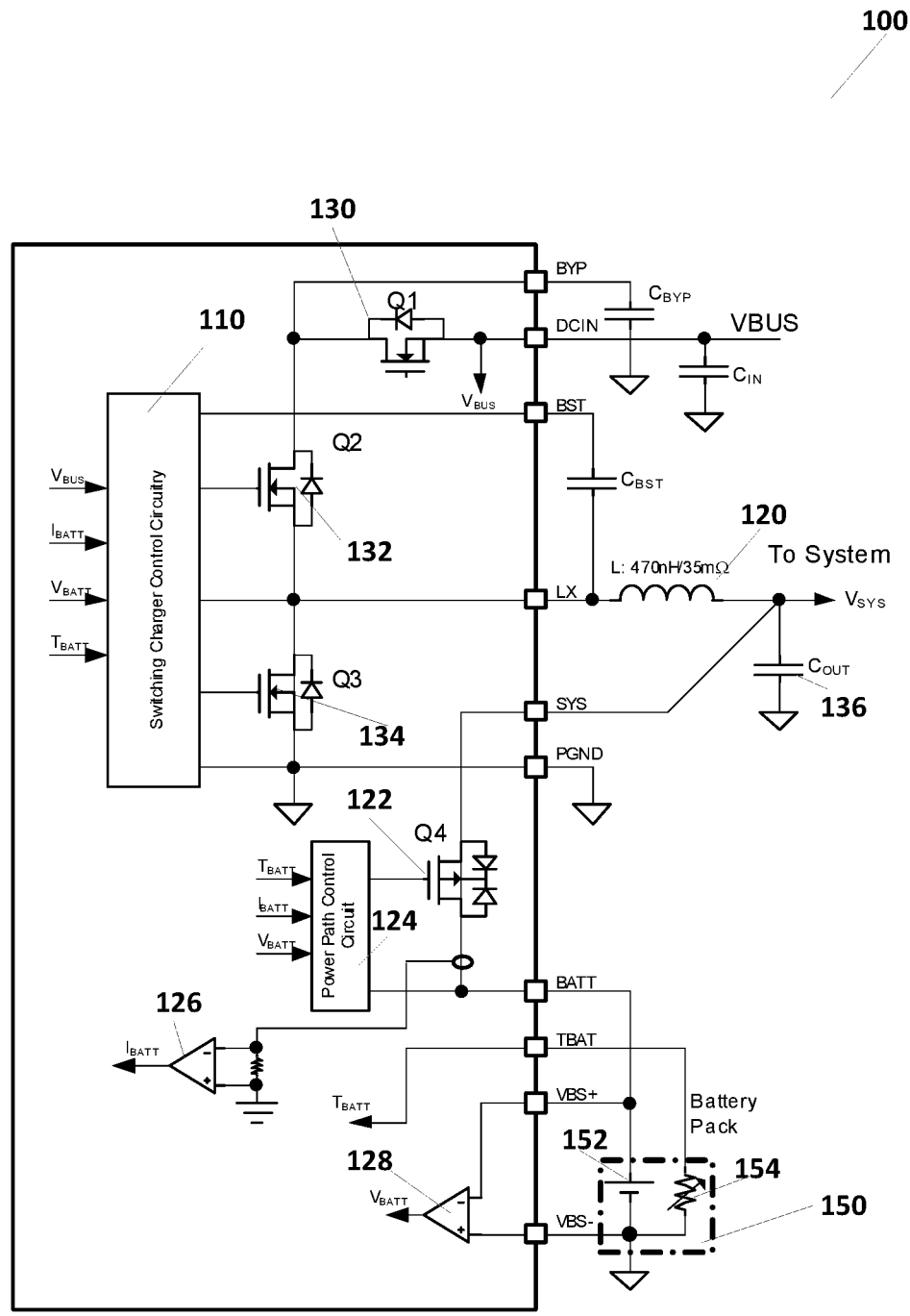
FIG. 1 illustrates a conventional battery charging system.

FIG. 1 illustrates a conventional charging system 100. Charging system 100 includes a switching charging control circuit 110 coupled to drive the gates of transistors 130 (Q1), 132 (Q2), and 134 (Q3). Transistor 130 (Q1) is a battery reverse blocking transistor and is closed by controller 110 when an outside voltage $V_{Bus}$ is present and open when $V_{Bus}$ is not present.

Transistors 132 (Q2) and 134 (Q3) are coupled in series between blocking transistor 130 and ground. The node between transistor 132 and 134 is coupled to inductor 120, which is in series with output capacitor 136. Transistors 132, 134, and inductor 120 form a buck regulator that functions as a switching charger. The system voltage is provided by inductor 120 and can be used to power an outside system. Furthermore, the system voltage is coupled to switch transistor 122 to provide, or receive, power from battery pack 150. Transistor 122 (Q4), which has a gate coupled to power path control circuit 140, is a battery switch that controls the power path to battery pack 150. Each of transistors 130, 132, 134, and 122 can be MOSFET transistors.

Control circuitry 110 receives inputs $V_{BUS}$, $I_{Batt}$, $V_{Batt}$, and $T_{Batt}$. The voltage $V_{BUS}$ is the input DC voltage from an external power source. The voltage $V_{BUS}$ is connected to the high voltage side of the series coupled transistors 132 and 134 through blocking transistor 131. The input $I_{Batt}$ indicates the current into or out of battery back 150 and is measured with current sensor 126 coupled to measure the current from battery 152 of battery pack 150 through transistor 122. The voltage $V_{Batt}$ is determined by voltage sensor 128, which is coupled across battery pack 150 to indicate the battery voltage. The temperature signal $T_{Batt}$ is received from a temperature monitor 154 in battery pack 150.

Control circuit 110 drives the gates of switching transistors 132 and 134 accordingly to provide power to function with inductor 120 and capacitor 136 as a Buck regulator. The voltage from inductor 120 can then be coupled to battery pack 150 through transistor 122 to charge battery 152 of battery pack 150. The gate of transistor 122 is coupled to power path control circuit 124 which controls the power path according to the battery temperature $T_{Batt}$, the current $I_{Batt}$, and the battery voltage $V_{Batt}$ in order to either charge or discharge battery pack 150 as needed.

System 100 presents multiple challenges to operation. In some embodiments, transistors 132 (Q2) and 133 (Q3) need to switch at high frequency (2 to (4 MHz). High frequency switching keeps the inductance of inductor 120 low (e.g. 0.47 µH in some application), to reduce the direct current resistance (DCR) value of inductor 120, to keep inductor 120 physically small, and to keep good efficiency of the operation of inductor 120 and capacitor 136. However, a high switching frequency increases switching loss, offsetting at least some of the efficiency gain from the low DCR of inductor 120.

Furthermore, to meet current fast charging requirements, bus voltage VBUS needs to be increased. These increased bus voltages also meet the VBUS pin current requirements of USB micro connectors. For example, a battery charging current of 3 A or higher may need a VBUS voltage of 9V to 12V to meet these requirements. However, higher VBUS voltages generate more switching loss at high switching frequency since the switching loss is proportional to the voltage across transistors 132 (Q2) and 134 (Q3), which is the VBUS voltage. A high VBUS voltage can also increases the ripple current of inductor 120, and thus provides more ripple voltage at the system voltage VSYS. To reduce ripple voltage of VSYS, the switching frequency should be increased while the inductance of inductor 120 is kept the same, further increasing the switching loss and reducing the efficiency of system 100.

Additionally, higher VBUS voltage requirements need high voltage processes, which requires that elements of the circuitry be larger. This results in larger die sizes and resulting higher costs of production to meet the efficiency requirements. Although increased MOSFET sizes (reducing resistive Rdson values) can reduce conduction loss, the larger sizes further increase switching loss. Therefore, there is a limit on reducing MOSFET conduction loss to achieve higher efficiencies in system 100.

Embodiments of the present invention provide ways of improving the switching charging system 100 as illustrated in FIG. 1. In particular, there is a need to provide for smaller output inductors in both inductance and physical size while providing for switching at lower frequencies. This will reduce the DCR further in order to increase the system efficiency and reduce the ripple current in order to meet ripple voltage requirements for the system voltage $V_{SYS}$.

Embodiments according to the present invention provide a new switching charge topology to enable lower switching frequency without incurring the penalty of large-sized inductors. The switching topology also reduces switching loss, thereby increasing the system efficiency. Further, the new switching topology enables the use of lower voltage processes to handle high input voltages and further reduce the die size and die cost of producing the charger. Additionally, the new topology can enable faster charging currents (e.g. 3 A or higher) while keeping $V_{BUS}$ currents below the current limit of a micro USB (1.8 A) or a Type C connector (2.5 A). Further, we can increase transistor size (resulting in small Rdson values) to further reduce transistor conduction loss without the penalty of increasing switching loss.

Figure 2:
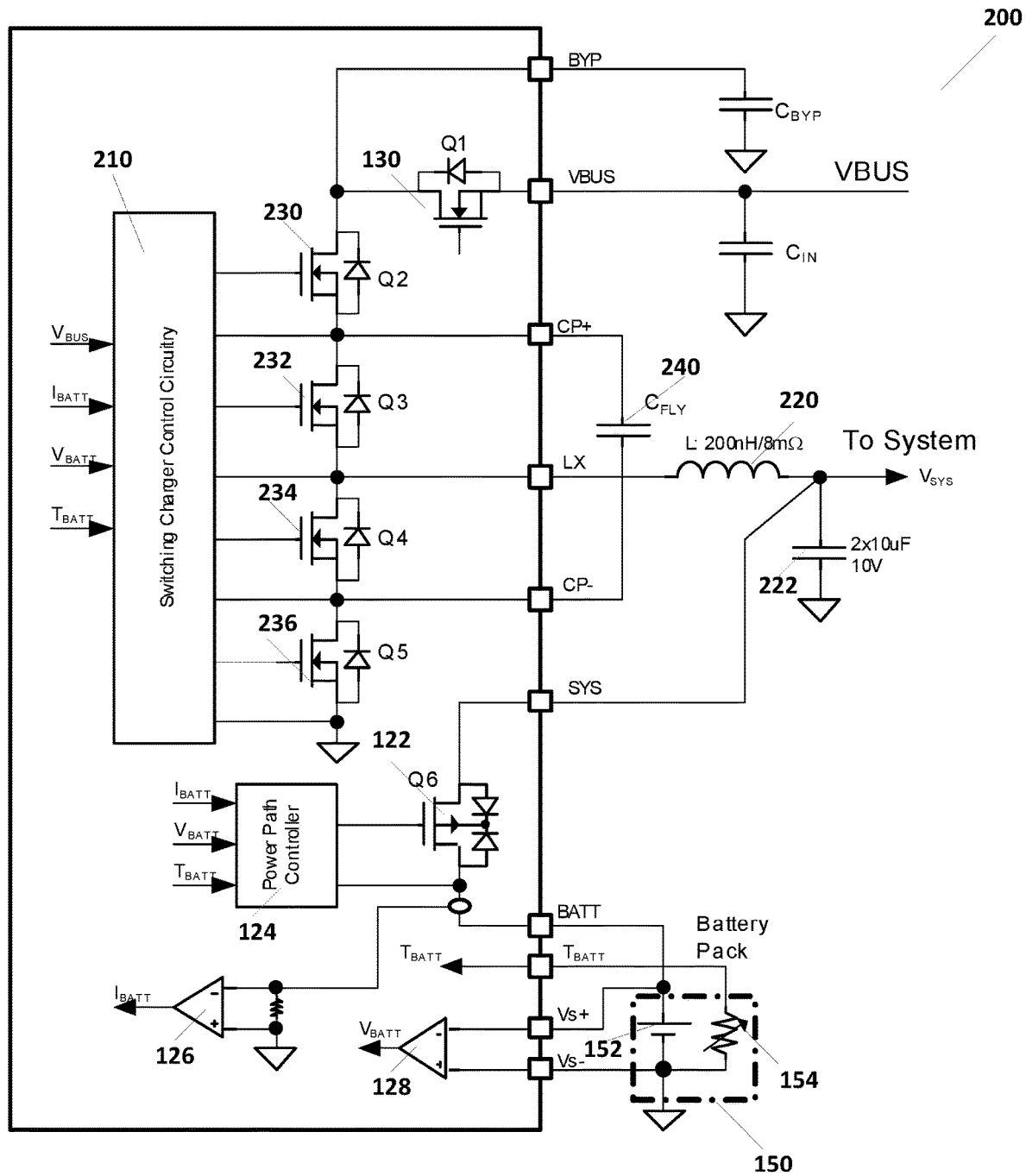
FIG. 2 illustrates a battery charging system according to some embodiments of the present invention.

FIG. 2 illustrates a switched charging system 200 according to some embodiments of the present invention. As shown in FIG. 2, switching charger control circuitry 210 is coupled to the gates of series-coupled transistors 230 (Q2), 232 (Q3), 234 (Q4), and 236 (Q5). Furthermore, a capacitor 240 ($C_{FLY}$) is provided across the series-coupled pair of transistors 232 (Q3) and 234 (Q4). Output inductor 220, which is coupled at the node between transistors 232 and 234, can now be smaller than output inductor 120 illustrated in FIG. 1 (both in physical size and in inductance). Series-coupled transistors 230, 232, 234, and 236 can be individually driven to make system 200 operate seamlessly at any duty cycle (e.g. varying from 1% to 99%).

The voltage across the series coupled transistors 232 (Q3), and 234 (Q4) during normal operation can be half of the input voltage on VBUS due to the introduction of the capacitor 240 ($C_{FLY}$) positioned across them. Consequently, the switching loss of each of transistors 230, 232, 234, and 236 is only one quarter of that of system 100 illustrated in FIG. 1 at the same switching frequency. Even though there are now four MOSFETs in the series of transistors 230, 232, 234, and 236, the total switching loss is half of that of system 100 when switching at the same frequency. System 200 further enables a low voltage process for use with high VBUS voltages (VBUS/2) because the transistors 232 and 234 are switched over half of the bus voltage.

Further, the voltage across inductor 220 during normal operation is less than half that of inductor 120 in FIG. 1. Thus the inductor value for inductor 220 can be less than half that of inductor 120 of FIG. 1 at the same switching frequency and the same VBUS voltage. Enabling inductor 220 to be smaller with a smaller inductance and small DCR, as illustrated in FIG. 2, further improves the efficiency of system 200 over that of system 100. If the VBUS voltage can be adjusted (e.g. use USB PD) based on VSYS value to keep VBUS equal to twice that of VSYS, the inductance of inductor 220 can further be reduced. Additionally, the inductance of inductor 220 can be the same as that of inductor 120 and the switching frequency can be reduced. This further results in increased system efficiencies.

Consequently, some embodiments of the present invention include series coupled switching transistors 230 (Q2), 232 (Q3), 234 (Q4), and 236 (Q5) with a flying capacitor 240 $C_{FLY}$ coupled between transistors 232 (Q3) and 234 (Q4). This arrangement combined with output inductor 220 with inductance and switched such that the VBUS voltage is adjusted according to VSYS to keep VBUS equal to or close to twice that of VSYS, which reduces the size and inductance of output inductor 220, reduces the switching frequency to improve system efficiency and enables the use of lower voltage processes to meet the higher VBUS voltages. Further, because of the lower voltages, die sizes and costs are reduced.

As is illustrated in FIG. 2, transistor 230 and transistor 236 are operated to charge flying capacitor 240 while transistors 232 and 234 are operated as switching capacitors to drive the buck regulator formed with inductor 220. In some embodiments, an efficient driving scheme for the four transistors 230, 232, 234, and 236 (Q2 to Q5) can be employed to individual drive each MOSFET to make system 200 operate seamlessly for duty cycles varying from 1% to 99%. Additionally, system 200 includes minimal external bootstrap capacitors (two, $C_{BPP}$ on a bypass circuit and bus voltage capacitor $C_{IN}$, only are shown in the example system 200 illustrated in FIG. 2). Additionally, system 200 can control the VBUS voltage to be twice the VSYS voltage to achieve the best efficiency. Further, the voltage across the flying capacitor can be varied to meet the best line and load transient requirements.

The above detailed description is provided to illustrate specific embodiments of the present invention and is not intended to be limiting. Numerous variations and modifications within the scope of the present invention are possible. The present invention is set forth in the following claims.

What is claimed is:

1. A charging system, comprising:
a first transistor coupled to receive a bus voltage;
a second transistor coupled in series with the first transistor;
a third transistor coupled in series with the first transistor and the second transistor;
a fourth transistor coupled between ground and the third transistor;
a switching control circuit coupled to control the gates of the first transistor, the second transistor, the third transistor, and the fourth transistor; and
a flying capacitor coupled across the second transistor and the third transistor;
wherein a node between the second transistor and the third transistor is configured to couple to an output inductor to provide a system voltage as the switching control circuit switches the first transistor, the second transistor, the third transistor, and the fourth transistor, and
wherein the first and fourth transistors are operated to charge the flying capacitor and the second transistor and the third transistor are operated separately from the first and fourth transistors as switching transistors to drive the output inductor.

2. The charging circuit of claim 1, wherein a bus switching transistor is coupled between the first transistor and the bus voltage.

3. The system of claim 1, wherein the system voltage is coupled through a power path switching transistor to a battery pack.

4. The system of claim 1, wherein power path switching transistor is coupled to a power path controller.

5. The system of claim 4, wherein the output inductor is arranged such that the bus voltage is twice that of the system voltage.

6. The system of claim 1, wherein the first transistor and the fourth transistor are operated by the control circuitry such that the voltage across the flying capacitor is varied according to line and load transients.

7. The system of claim 1, wherein the second transistor and the third transistor are operated with a duty cycle between 1% and 99%.

8. A method of charging, comprising:
receiving a bus voltage across series-coupled transistors, the series-coupled transistors including a first transistor coupled to the bus voltage, the second transistor coupled to the first transistor, a third transistor coupled to the second transistor, and a fourth transistor coupled between the second transistor and ground;
driving gates of the first transistor and the fourth transistor of the series-coupled transistors to charge a flying capacitor coupled across the second transistor and the third transistor of the series-coupled transistors; and
driving gates of the second transistor and the third transistor of the series-coupled transistors separately from the gates of the first transistor and the fourth transistor that have a node between the second transistor and the third transistor that can couple to an output inductor to supply a system voltage.

9. The method of claim 8, further including activating a separate transistor coupled between the bus voltage and the series-coupled transistors.

10. The method of claim 8, wherein the system voltage is coupled to charge a battery pack.

11. The method of claim 10, further including activating a switching transistor coupled between the system voltage and the battery pack.

12. The method of claim 8, wherein the bus voltage is twice that of the system voltage.

13. The method of claim 8, wherein the flying capacitor is charged according to line and load transients.

14. The method of claim 8, wherein driving gates of the second transistor and the third transistor of the series-coupled transistors that have a node between that that is coupled to the output inductor includes driving the gates at a duty cycle over a large range between 1% and 99%.

* * * * *